(12) United States Patent
Dominico et al.

(10) Patent No.: US 11,897,710 B2
(45) Date of Patent: Feb. 13, 2024

(54) DECORATOR ASSEMBLY

(71) Applicant: Stolle Machinery Company, LLC, Centennial, CO (US)

(72) Inventors: James W. Dominico, Kinnelon, NJ (US); Weniek (Rex) E. Jablonski, Randolph, NJ (US); Russell DiDonato, Union, NJ (US); Leonard A VerHoven, Castle Rock, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

(21) Appl. No.: 17/445,315

(22) Filed: Aug. 18, 2021

(65) Prior Publication Data

US 2021/0380355 A1 Dec. 9, 2021

Related U.S. Application Data

(63) Continuation-in-part of application No. 16/353,003, filed on Mar. 14, 2019, now Pat. No. 11,124,016.

(Continued)

(51) Int. Cl.
*B65G 59/10* (2006.01)
*B41F 17/28* (2006.01)
(Continued)

(52) U.S. Cl.
CPC .......... *B65G 59/108* (2013.01); *B41F 17/002* (2013.01); *B41F 17/28* (2013.01); *B65G 59/066* (2013.01)

(58) Field of Classification Search
CPC .......... B41F 17/28; B44C 5/00; B65G 59/00; B65G 59/066; B65G 59/108; Y10T 156/1771
See application file for complete search history.

(56) References Cited

U.S. PATENT DOCUMENTS 3,591,047 A * 7/1971 Buhle .................... B65G 29/02
221/151
3,709,349 A * 1/1973 Buhayar ................. B41F 17/28
198/468.4
(Continued)

FOREIGN PATENT DOCUMENTS

DE 1957652 6/1971
DE 1957652 A1 6/1971
(Continued)

OTHER PUBLICATIONS

Japanese Patent Office, JP Patent Application No. 2020-548684 first Office Action and English translation, dated Dec. 21, 2021, 3 pages.

(Continued)

*Primary Examiner* — Gene O Crawford
*Assistant Examiner* — Kelvin L Randall, Jr.
(74) *Attorney, Agent, or Firm* — Eckert Seamans Cherin & Mellott, LLC

(57) ABSTRACT

A decorator assembly includes a cup holder assembly, a cup transfer assembly, and a decorator mandrel turret assembly. The cup holder assembly is structured to hold a number of cups in a nested, bottom leading configuration. The cup transfer assembly is structured to move cups from said cup holder assembly to a decorator mandrel turret assembly. The decorator mandrel turret assembly is structured to rotatably support a number of cups.

13 Claims, 13 Drawing Sheets

Related U.S. Application Data

(60) Provisional application No. 62/642,625, filed on Mar. 14, 2018.

(51) Int. Cl.
  *B41F 17/00* (2006.01)
  *B65G 59/06* (2006.01)

(56) References Cited

U.S. PATENT DOCUMENTS

| | | | | |
|---|---|---|---|---|
| 3,759,303 | A | * | 9/1973 | Henrichs .................. B65B 43/44 198/474.1 |
| 3,908,572 | A | * | 9/1975 | Johnson ............. B21D 51/2653 413/27 |
| 4,445,431 | A | * | 5/1984 | Stirbis ..................... B41F 17/14 101/40 |
| 4,771,879 | A | * | 9/1988 | Shriver ................... H01M 4/66 198/803.5 |
| 4,927,319 | A | * | 5/1990 | Montali .................. B65B 57/20 221/277 |
| 2013/0056331 | A1 | | 3/2013 | Goeb |
| 2019/0291407 | A1 | * | 9/2019 | Schwartzburg ......... B41F 17/28 |

FOREIGN PATENT DOCUMENTS

| | | |
|---|---|---|
| GB | 1110877 | 4/1968 |
| JP | 2003-312833 | 11/2003 |

OTHER PUBLICATIONS

European Patent Office, EP Patent Application No. 19767006.0 Supplementary European Search Report, dated Oct. 26, 2021, 8 pages.
Brazilian Patent Office, BR Patent Application No. 1120200184993 Preliminary Office Action, dated Jan. 5, 2023, 4 pages (No English translation available).
Chinese National Intellectual Property Administration (CNIPA), CN Patent Application No. 202210461419.1, Second Office Action, dated Sep. 26, 2023, 11 pages, and English translation.

* cited by examiner

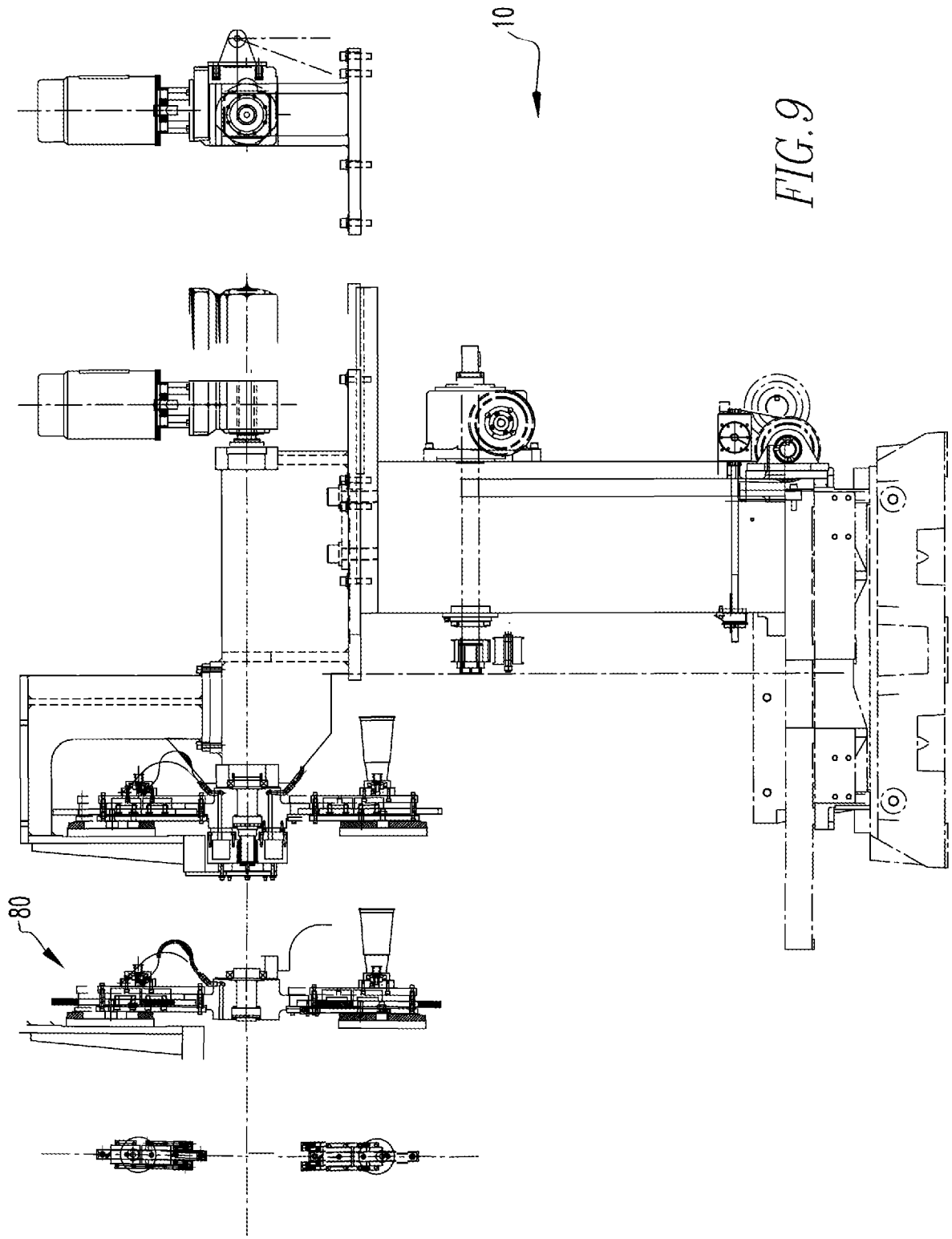

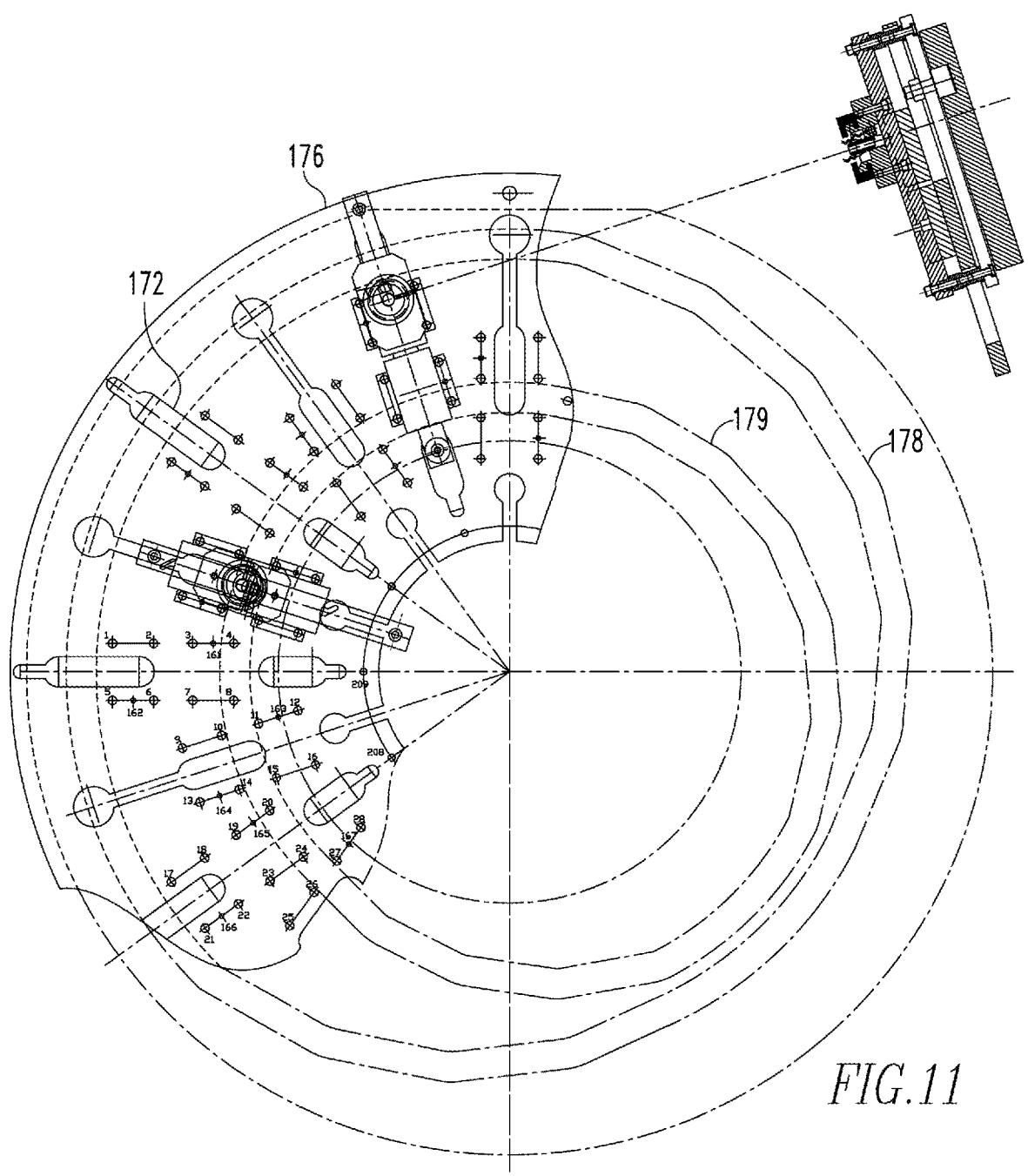
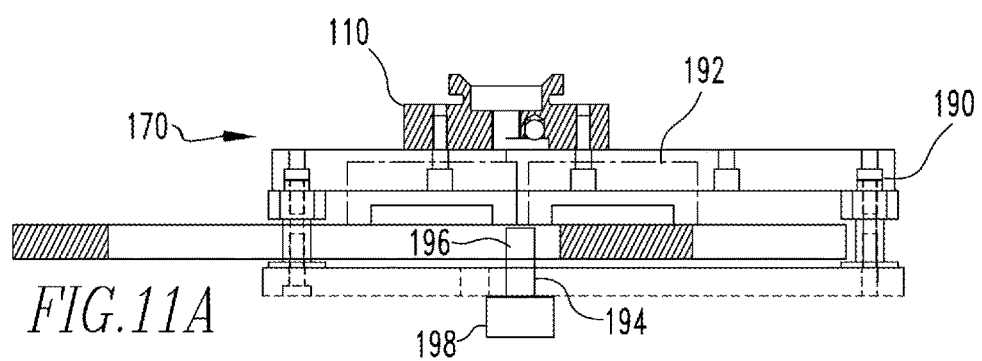
FIG.11
FIG.11A

DECORATOR ASSEMBLY

CROSS REFERENCE TO RELATED APPLICATIONS

This application is a continuation patent application and claims priority to U.S. patent application Ser. No. 16/353,003, filed Mar. 14, 2019, which application claims priority to U.S. Provisional Patent Application Ser. No. 62/642,625, filed Mar. 14, 2018, entitled, DECORATOR ASSEMBLY.

FIELD OF THE INVENTION

The disclosed concept relates generally to decorator machines for decorating plastic cups and, more specifically, to a cup feeder assembly for a decorator machine wherein the cups are disposed in a bottom-out configuration in the feeder assembly and wherein a decorator machine turret assembly (which supports the cup mandrels during printing) does not index, i.e., move with an intermittent motion.

BACKGROUND OF THE INVENTION

A decorator assembly for tapered plastic cups includes a cup storage assembly, a feeder assembly, a decorator mandrel turret assembly, and a number of printing assemblies. The cup storage assembly holds a number of cups in a nested configuration. The feeder assembly takes cups from a continuous nested stack of cups which are passed through the feeder assembly in a top leading (open end leading) configuration. That is, the cups are engaged by a set of de-nesting/feeder screws which partially separate the first cup from the stack at the cup storage assembly and discharge the cup from the feeder assembly at the decorator mandrel turret assembly. The discharge of the cups is assisted by a directed, intermittent jet of air.

The decorator mandrel turret assembly includes a rotating turret (a disk shaped body) including a number of elongated mandrel assemblies thereon. In one embodiment, the mandrel assemblies extend from an axial face of the turret and in a direction generally parallel to the axis of rotation of the rotating turret. The rotating turret moves in an "indexing" or intermittent motion. That is, the turret rotates until a mandrel is aligned with the feeder assembly then stops, or "dwells," at this position. While the turret is stopped, a cup is ejected from the feeder assembly and is disposed on the mandrel. The turret then indexes (rotates) again until a different mandrel is aligned with the feeder assembly and the process repeats. As is known, each mandrel assembly includes a rotating body disposed about a mandrel shaft. The outer surface of the mandrel body is shaped to conform to the inner surface of the cups. Further, the mandrel assembly uses a vacuum to help draw the cup down fully onto the mandrel body. This system has several problems.

For example, during the separation of the cups in the feeder assembly, the de-nesting/feeder screws engage only the upper portion of the cups where the cups have the greatest diameter. That is, the nesting/feeder screws engage a rolled lip of the cup and a short area commonly referred to as the stacking shoulder. Because the nesting/feeder screws engage only a portion of the cup, the orientation of the cup can change while in the feeder assembly. That is, the orientation of the cups can become misaligned relative to the nesting/feeder screws. This is a problem.

Further, in the configuration discussed above, it is understood that the ejection end of the feeder assembly must be spaced from the rotating mandrels by a distance that is at least as great as the height of the cups. That is, a cup cannot be fully disposed on a mandrel while in the feeder assembly as that would mean that the mandrel is at least partially disposed within the feeder assembly. This configuration cannot be because the mandrels are also rotating with the turret and that rotation would cause the mandrel to impact on the feeder assembly. Thus, as the cups are ejected from the feeder assembly (upper end first), the feeder assembly (which only engages the upper end of the cup) does not control the orientation of the cup as the cup moves onto the mandrel. This period wherein the cup does not contact the feeder assembly nor the mandrel is identified herein as a period of "free travel." The distance the cup travels during the period of free travel is almost equivalent to the height of the cup. This is a problem because during the period of free travel, a cup can become misaligned relative to the mandrel. If this happens, the cup does not seat properly on the mandrel. This is also a problem.

Further, there is a possibility that a cup will not travel the distance between the feeder assembly and the mandrel during the period wherein the turret is at rest. That is, the cup can be partially disposed in the feeder assembly and not seated on the mandrel when the rotating turret starts to move. When this happens, the cup impacts both the feeder assembly and the mandrel and can damage either, or both. Further, the cup can be damaged if it is caught between a stationary feeder assembly and moving mandrel turret assembly, causing a machine malfunction and shut down. This is a problem.

Further, the indexing nature of the prior art system is a problem as well. That is, in order for the actions described above to occur, the system speeds are limited to approximately 400-425 cups per minute (with tall cups).

There is, therefore, a need for a decorator assembly that addresses the identified problems.

SUMMARY OF THE INVENTION

These needs, and others, are met by at least one embodiment of this invention which provides a decorator assembly including a cup holder assembly, a cup transfer assembly, and a decorator mandrel turret assembly. The cup holder assembly is structured to hold a number of cups in a nested, bottom leading configuration. The cup transfer assembly is structured to move cups from said cup holder assembly to a decorator mandrel turret assembly. The decorator mandrel turret assembly is structured to rotatably support a number of cups.

BRIEF DESCRIPTION OF THE DRAWINGS

A full understanding of the invention can be gained from the following description of the preferred embodiments when read in conjunction with the accompanying drawings in which:

FIG. 9 is a schematic, partially exploded side view of a decorator assembly.

FIG. 11 is another schematic top view of a transfer disk assembly with selected elements removed for clarity. FIG. 11A is a schematic cross-sectional side view of a cup mounting assembly.

DETAILED DESCRIPTION OF THE INVENTION

Figure 1:
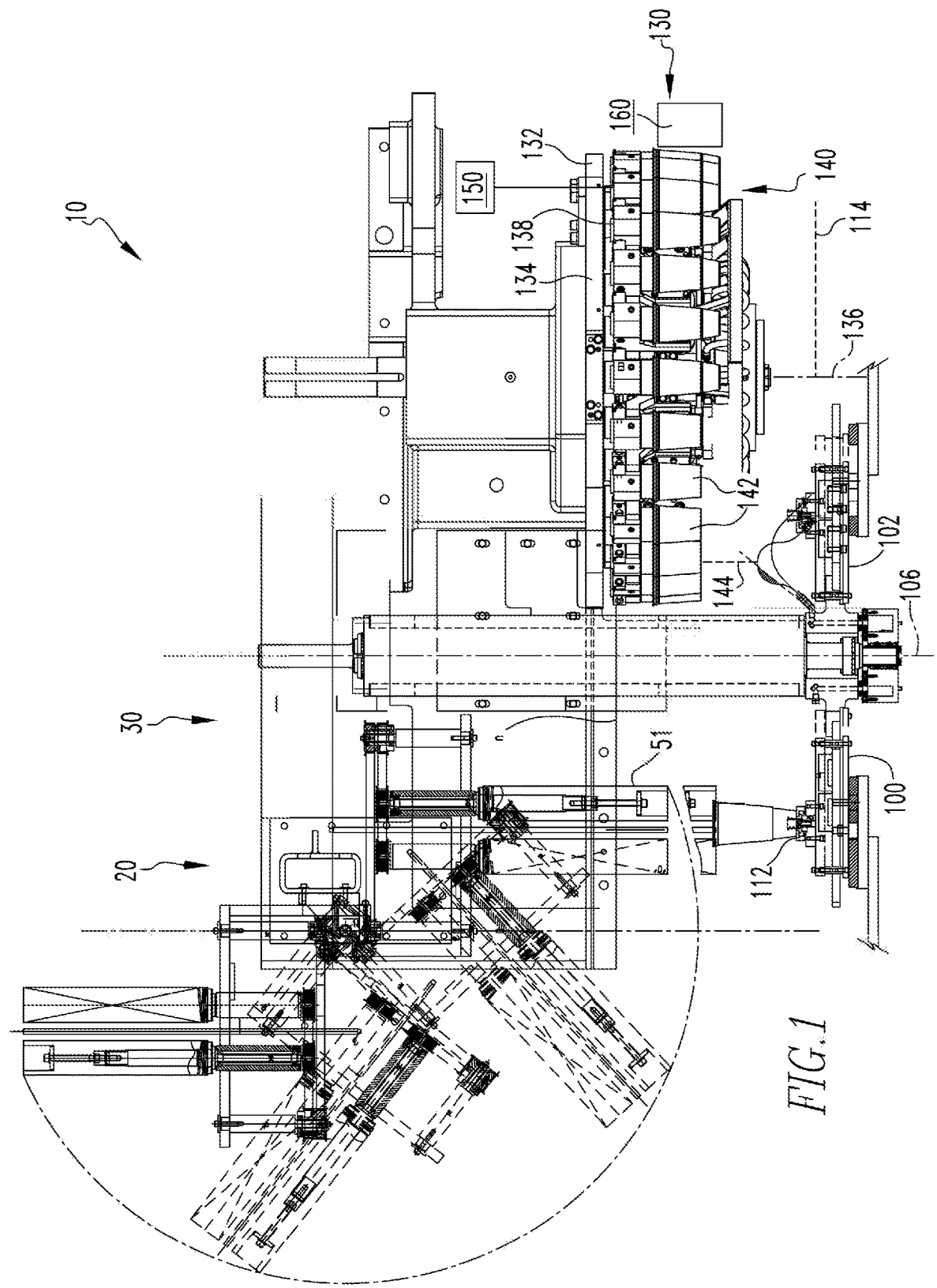
FIG. 1 is a schematic side view of a decorator assembly.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can. Further, as used herein, "radially extending" means extending in a direction or a radial line. That is, for example, a "radially extending" line extends from the center of the circle or cylinder toward the radial side/surface.

As used herein, "generally curvilinear" includes elements having multiple curved portions, combinations of curved portions and planar portions, and a plurality of planar portions or segments disposed at angles relative to each other thereby forming a curve.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

Figure 2:
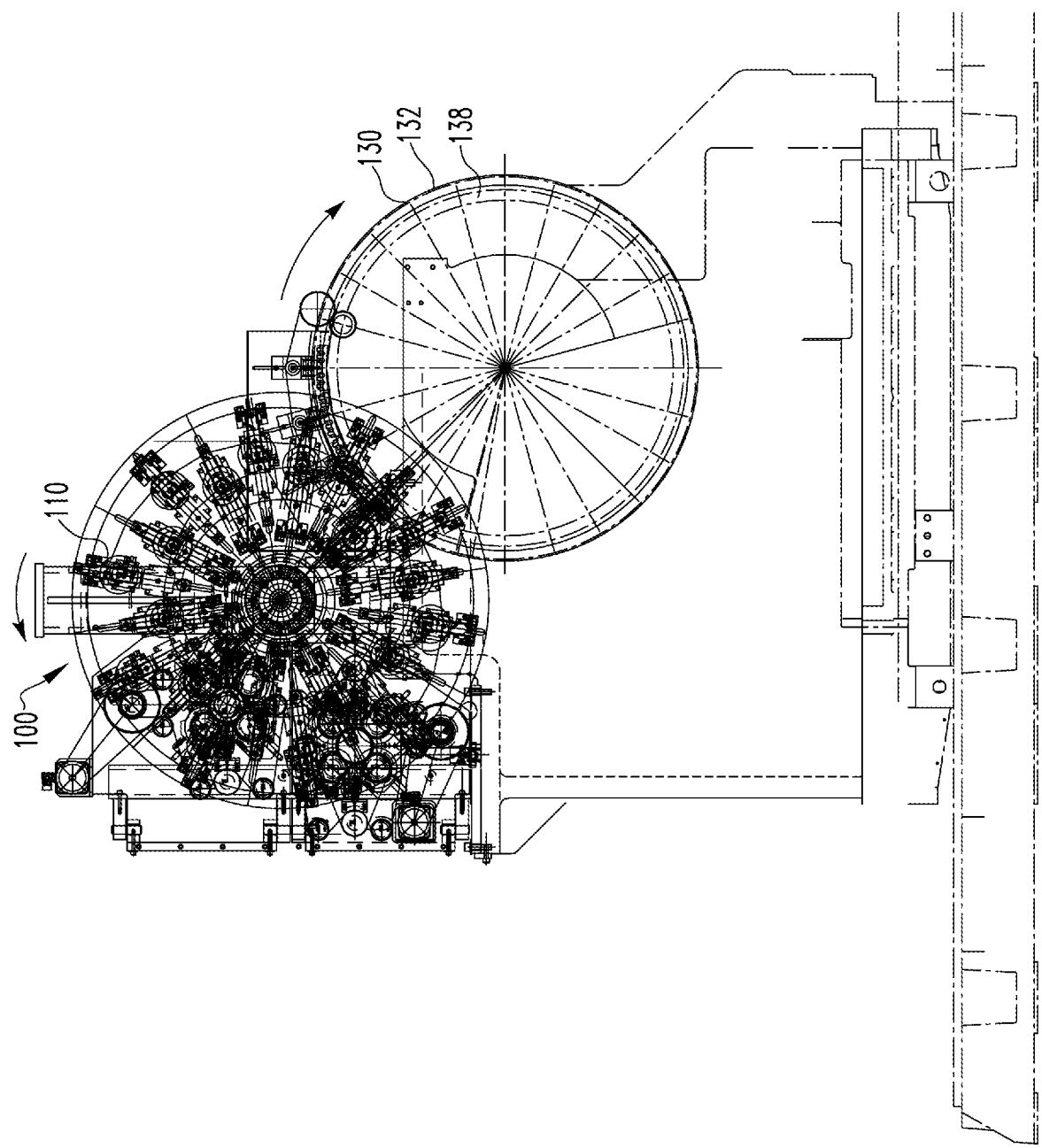
FIG. 2 is a schematic top view of a decorator assembly.

As shown in FIGS. 1 and 2, a decorator assembly 10 is structured to move cups 1 from a storage to a print assembly 160 whereat the cups are individually decorated. As used herein, a "cup" means, and inherently includes, an elongated body having a base with an upwardly depending, and outwardly tapered, sidewall. The end opposite the base is open. The body defines a substantially enclosed space. The body has an outer surface and an inner surface. "Cups" can be "nested." As used herein, "nested" means that one cup body is substantially disposed within an adjacent cup body with the uppermost and widest portion of the body extending from the adjacent cup body.

The decorator assembly 10, in an exemplary embodiment, includes a cup holder assembly 20, a cup transfer assembly 30, a mandrel turret assembly 130, and a print assembly 160, some elements shown schematically. The cup holder assembly 20 is structured to, and does, hold a number of cups 1 in a nested, bottom leading configuration. As used herein, "bottom leading" means the cups 1 move with the base at the front of the cup's path of travel. The cup transfer assembly 30 is structured to, and does, move cups 1 from the cup holder assembly 20 to the mandrel turret assembly 130. The mandrel turret assembly 130 is structured to, and does, rotatably support a number of cups 1.

Figure 3:
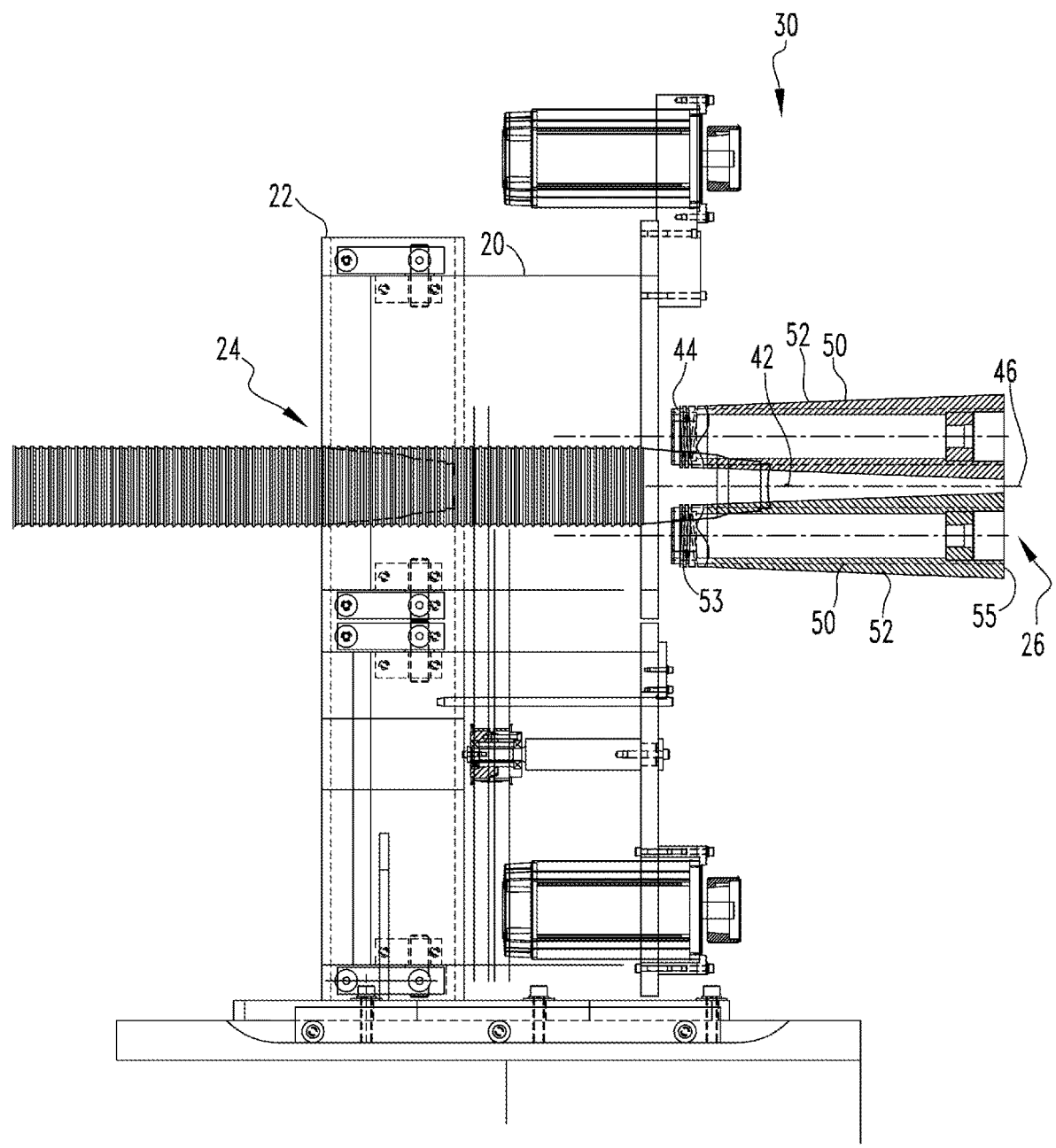
FIG. 3 is schematic side view of a feeder assembly.

As shown in FIG. 3, the cup holder assembly 20 includes a frame 22, or similar body, defining a number of bays 24 structured to support a stack of cups 1. As used herein, a "stack" of cups 1 means a plurality of nested cups 1. In an exemplary embodiment, there are two bays 24, a first bay 24A and a second bay 24B disposed in a spaced relation. That is, in an exemplary embodiment, the first bay 24A and the second bay 24B are not disposed immediately adjacent each other. It is understood that, via automation or manual labor, the cups 1 are constantly moved into the bays 24 so that there is an uninterrupted supply of cups 1. The cup holder assembly frame 22 defines two outlets 26, a first outlet 26A and a second outlet 26B, whereat cups 1 exit the cup holder assembly 20.

Figure 4:
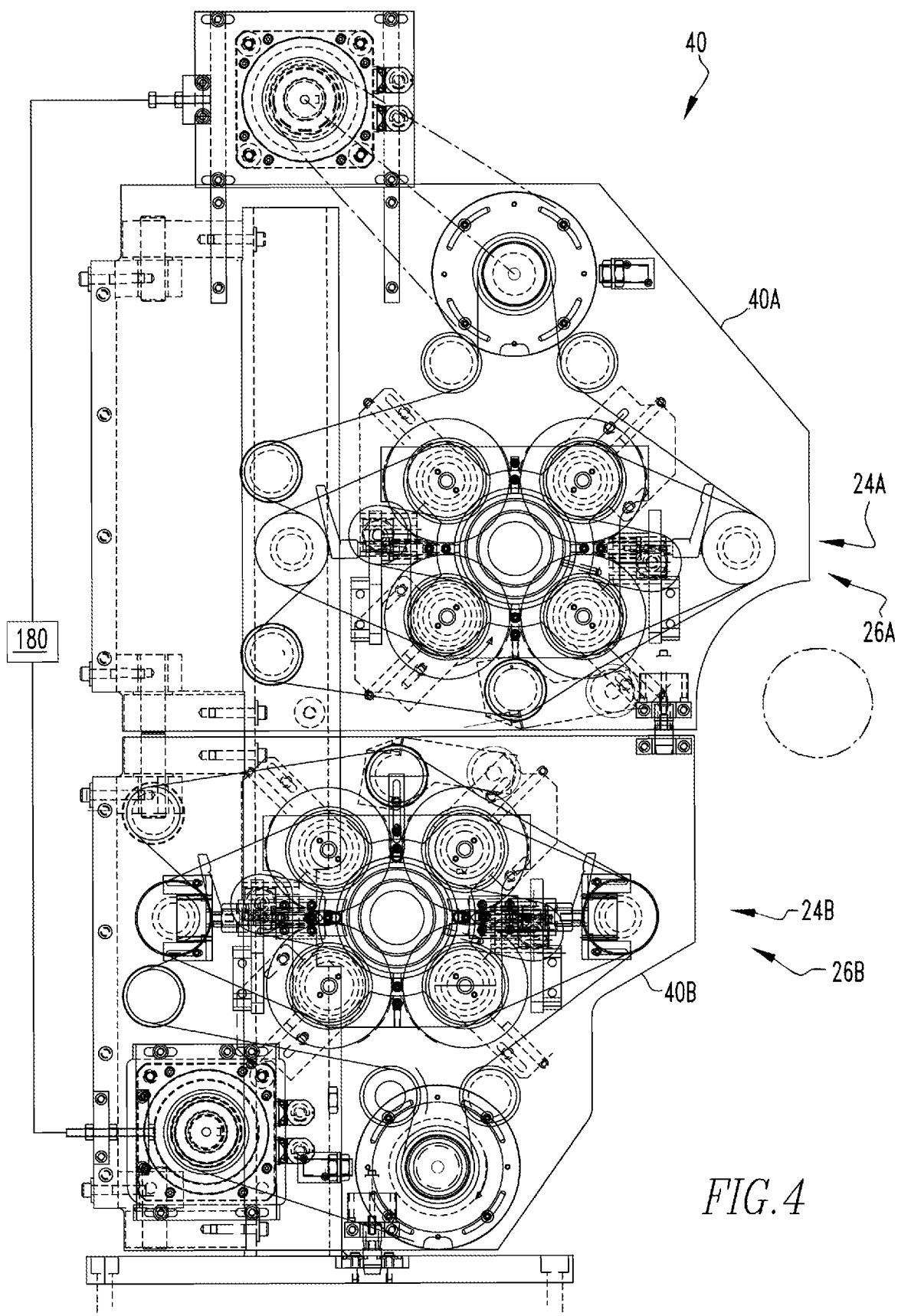
FIG. 4 is a schematic end view of a feeder assembly.

The cup transfer assembly 30 is structured to, and does, move cups 1 from the cup holder assembly 20 to the mandrel turret assembly 130. In an exemplary embodiment, the cup transfer assembly 30 includes a number of feedscrew assemblies 40, shown in FIG. 4, and a transfer disk assembly 100. Each feedscrew assembly 40 is structured to, and does, de-nest and move a cup 1 from a nested stack of cups 1 to the transfer disk assembly 100, discussed below. As used herein, to "de-nest" means to separate cups 1 that are in a nested configuration. It is understood that there is one feedscrew assembly 40 for each bay 24 of the cup holder assembly 20. Thus, in an exemplary embodiment, there are two feedscrew assemblies 40, a first feedscrew assembly 40A and second feedscrew assembly 40B. Each feedscrew assembly 40 is disposed at a cup holder assembly frame outlet 26.

As shown in FIGS. 5-8, each feedscrew assembly 40 defines an elongated cup path 42 having a first end 44 and a second end 46. When in motion, cups 1 move from the cup path first end (or upstream end) 44 to the cup path second end (or downstream end) 46. Thus, it is understood that the cup path first end 44 is disposed adjacent, or immediately adjacent, the cup transfer assembly 30. Further, the cup path second end 46 is disposed adjacent, or immediately adjacent, the transfer disk assembly 100. Each feedscrew assembly 40 is further structured to substantially envelop a cup 1 as the cup 1 moves from the cup path first end 44 to the cup path second end 46. As used herein, to "envelope" means that the feedscrew assembly 40, and as discussed below, the feedscrew members, contact or engage a cup 1 along a line, or multiple points forming a line. When a cup is "enveloped" the cup 1 cannot move freely. Thus, an enveloped cup 1 resists changes to the orientation of the cup 1 while in the feedscrew assembly 40. This solves the problems noted above. Further, when an object travels in one direction over a path, such as the cups 1 traveling from the cup path first end 44 to the cup path second end 46, the cups move from "upstream" to "downstream." That is, as used herein, "upstream" means closer to the start of a path of travel and "downstream" means closer to the end of a path of travel.

Figures 5, 5A:
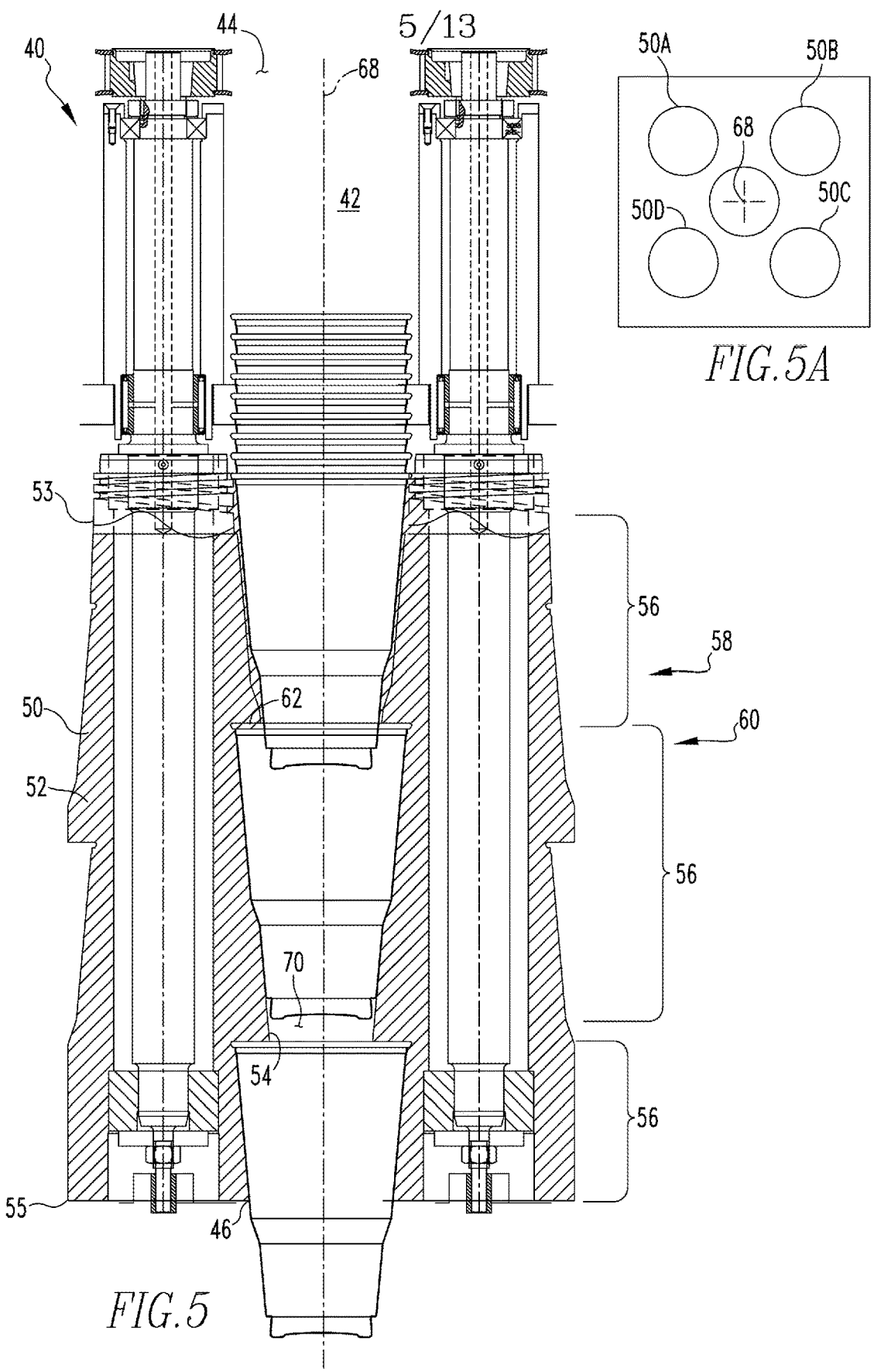
FIG. 5 is a schematic cross-sectional side view of a feeder assembly.
FIG. 5A is a schematic end view of a feeder assembly.
Figure 6:
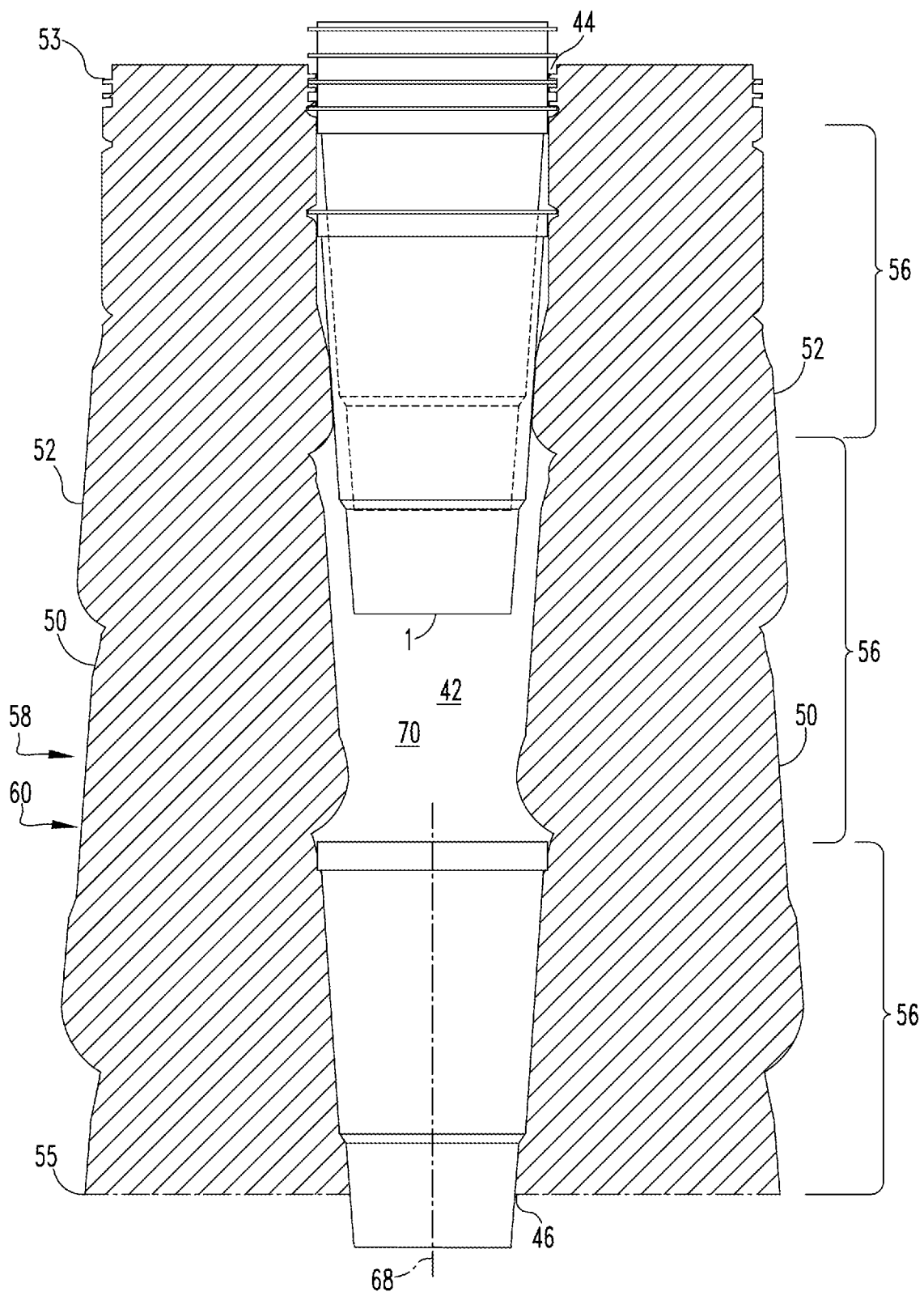
FIG. 6 is another schematic cross-sectional side view of a feeder assembly.
Figure 7:
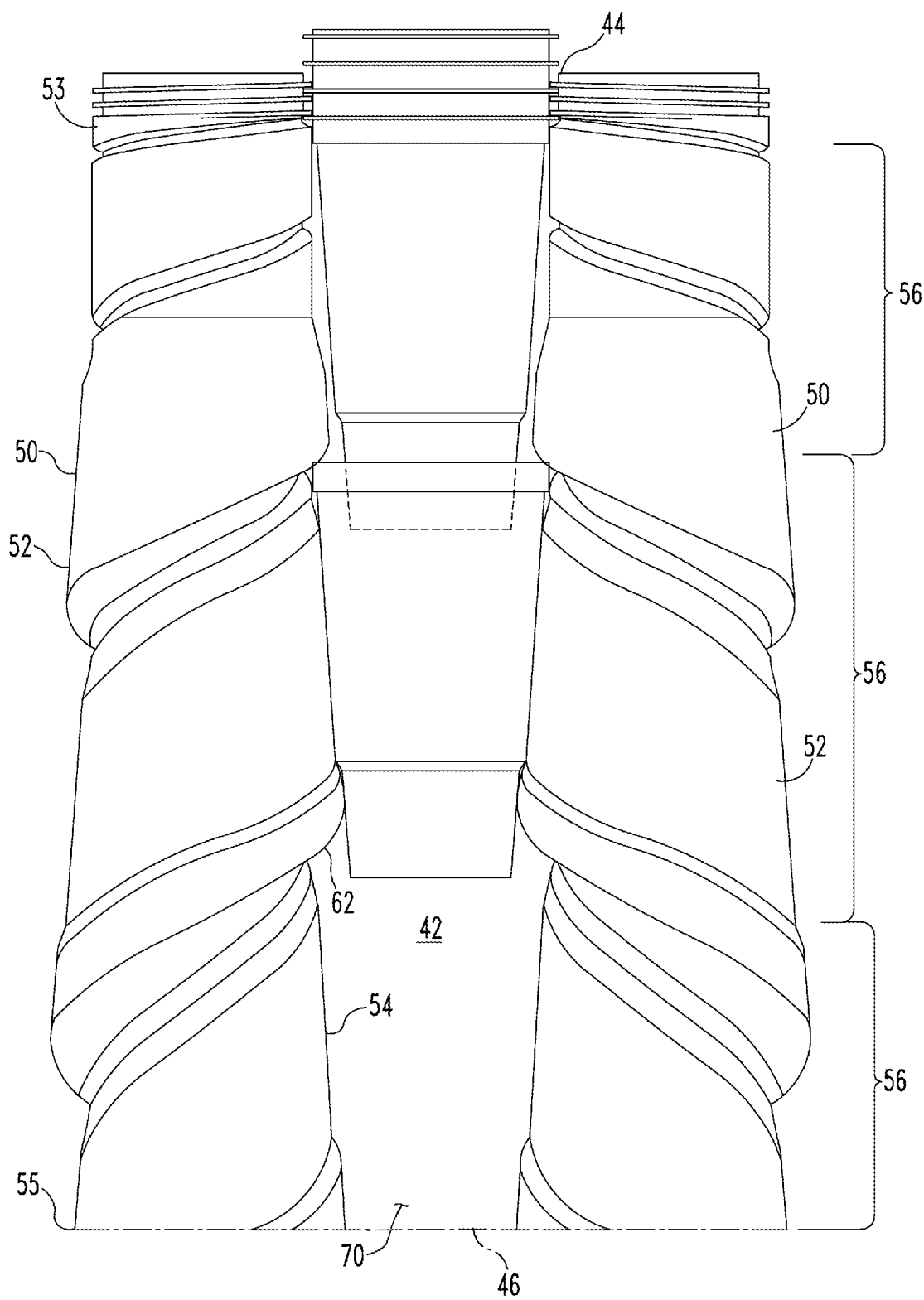
FIG. 7 is another schematic cross-sectional side view of a feeder assembly.

That is, each feedscrew assembly 40 includes a number of elongated feedscrew members 50. The feedscrew members 50 are rotatably coupled to a feedscrew assembly housing 51 and are structured to rotate about their longitudinal axes. That is, the feedscrew assembly 40 includes a motor, and in an exemplary embodiment a variable speed motor (neither shown), that is operatively coupled to the feedscrew members 50 and is structured to rotate the feedscrew members 50 at a substantially similar speed. In an exemplary embodiment, the feedscrew members 50 include an elongated body 52 having an outer surface 54. As discussed below, the feedscrew members 50 substantially define the cup path 42; thus, the feedscrew member bodies each have a first end (or upstream end) 53 to the cup path second end (or downstream end) 55. The feedscrew member body outer surface 54 defines a number of sequential helical conical portions 56. That is, when viewed in cross-section, as shown in FIG. 5, the feedscrew member body outer surface 54 defines a number of portions 56 having an upstream, narrow cross-sectional area 58 (the top of a truncated conical portion) and a downstream, wide cross-sectional area 60. Thus, there is a "ridge" 62 separating the adjacent sequential helical conical portions 56. That is, the "ridge," as used herein, is defined by the change in the cross-sectional areas of the adjacent sequential helical conical portions 56. Stated alternately, the bottom of one adjacent sequential helical conical portion 56 defines a "ridge" 62 with the greatest cross-sectional area. Further, it is understood that, in an exemplary embodiment, the ridge 62 is helical and the sequential helical conical portions 56 are shown in cross-section but that in three dimensions, and as the feedscrew members 50 rotate, the sequential helical conical portions 56 blend into each other. Stated alternately, the ridge 62 is a generally continuous ridge 62 disposed in a helical path about the longitudinal axis of the feedscrew member body 52.

In this configuration, the feedscrew member body outer surface 54 generally corresponds to the shape of a cup 1. In an exemplary embodiment, the cup 1 sidewall is generally tapered outwardly at a single angle. Thus, for such a cup 1, the feedscrew member body outer surface 54 has substantially the same taper. Another type of cup (not shown) has multiple tapers and/or radii. That is, the cup is wide at the top, the sidewall tapers at a consistent angle to an elevation near the bottom of the cup, at a location near the bottom of the cup, the sidewall radius is stepped down (i.e., there is a decrease in the radius over a short distance/height, or, the taper drastically increases for a short distance/height), then the sidewall tapers at a consistent angle to the bottom of the cup. Regardless of the shape of the cup sidewall, the feedscrew member body outer surface 54 has substantially the same taper. Further, the contour of the cup sidewall on the feedscrew member body outer surface 54 progresses helically about the feedscrew member body 52.

It is understood that when two generally cylindrical, or generally conical elements such as a tapered cup 1 and a feed screw member body conical portion 56, are oriented so that their longitudinal axes are generally parallel and the elements are disposed in contact with each other, the area of contact is generally a thin line. Thus, in an exemplary embodiment, wherein the feedscrew member body outer surface 54 is generally smooth, the feedscrew member body outer surface 54 is structured to, and does, contact a cup 1 sidewall along a line. In another embodiment, not shown, the feedscrew member body outer surface 54 includes a number of projections (not shown), in this configuration, the projections contact the cup 1 sidewall either in a broken line, or, in a broken, jagged line. That is, the projections contact the cup 1 sidewall at individual points, but if the points were connected by line segments, the overall shape would be a line or a jagged line. In another embodiment, not shown, the feedscrew member body outer surface 54 includes a number of minor helical ridges (not shown). The minor helical ridges are surface features and are not as pronounced as the ridge

62. That is, the minor helical ridges are undulations on the feedscrew member body outer surface 54 which, despite the undulations, is generally smooth (with the exception of the ridge 62). The minor ridges extend about the feedscrew member body 52 in a helical manner similar to the ridge 62. In this configuration, the minor ridges contact the cup 1 sidewall either in a broken line, or, in a broken, jagged line. Further, in an exemplary embodiment, each feedscrew member body outer surface 54 is resilient.

Further, in an exemplary embodiment, the "pitch" of the ridge 62, and therefore the length of the adjacent sequential helical conical portions 56, is variable along the length of the feedscrew member body 52. As used herein, "pitch" means revolutions about an axis over a distance along the same axis. Relative to the pitch at the feedscrew member body second end 55, the pitch at the feedscrew member body first end 53 is higher. That is, there are more revolutions, i.e., the ridge 62 wraps about (or partially about), at the feedscrew member body first end 53 than at the feedscrew member body second end 55. As discussed below, in this configuration, the feedscrew members 50 de-nest and separate the cups 1.

In an exemplary embodiment, shown in FIG. 5A, there are a plurality of feedscrew members 50A, 50B, 50C, 50D (four shown). The feedscrew members 50 are disposed adjacent to each other with the longitudinal axes thereof disposed substantially parallel to each other. That is, the feedscrew members 50 are disposed generally, or substantially, about ninety degrees apart about a prime axis 68. That is, the longitudinal axes of the four feedscrew members 50A, 50B, 50C, 50D are disposed generally, or substantially, an equal distance from the prime axis 68. The prime axis 68 is also the longitudinal axis of the cup path 42.

In this configuration, the feedscrew members 50 define a progressing cup cavity 70. That is, the space between the four feedscrew member body outer surfaces 54 and at one sequential helical conical portion 56, generally, or substantially, corresponds to the shape, i.e., the outer surface, of the cup 1. It is understood that the feedscrew members 50 are oriented about the axes so that the four feedscrew member body outer surfaces 54 define the progressing cup cavity 70. That is, the feedscrew members 50 are oriented so that corresponding portions of the feedscrew member body outer surfaces 54 are disposed about the same distance from the prime axis 68. For example, if first feedscrew member 50A has the ridge 62 oriented toward the prime axis 68 at a location one foot from the feedscrew member body first end (or upstream end) 53, then the other feedscrew members 50B, 50C, 50D are oriented in a similar manner. As used herein, a "progressing cup cavity" 70 means a cavity shaped to correspond to a cup 1 and wherein the cavity generally moves in a single direction.

In an alternate embodiment, not shown, there are two feedscrew members, as described above, that define the progressing cup cavity 70. The two feedscrew members are disposed about one hundred and eighty degrees apart about the prime axis 68. Further, in this embodiment, there are two elongated rails (not shown) disposed adjacent to the two feedscrew members. That is, the two rails are disposed about one hundred and eighty degrees apart from each other and about ninety degrees from the two feedscrew members.

Figure 8A:
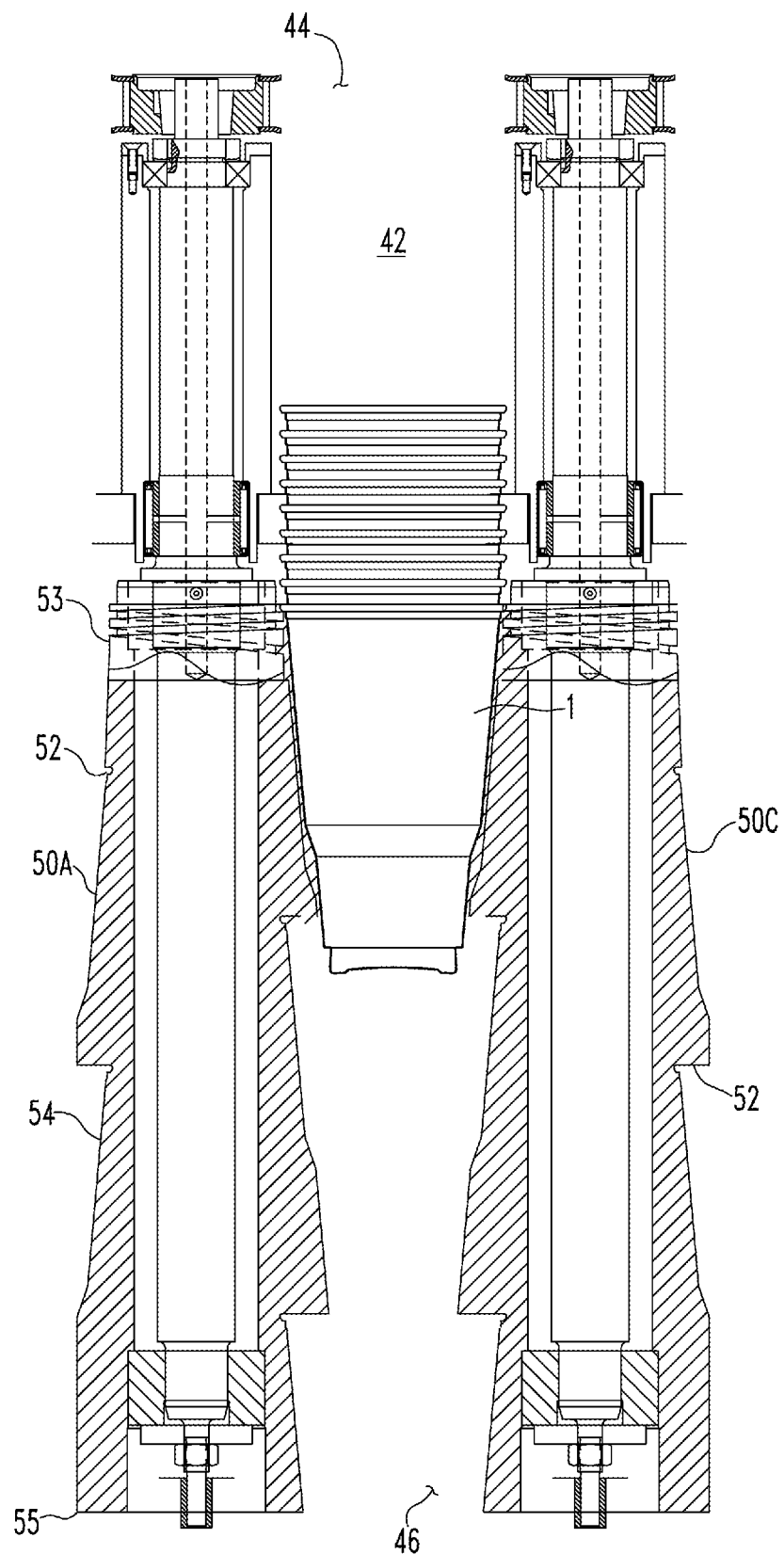
FIG. 8A is another schematic cross-sectional side view of a feeder assembly with a cup in a first position.
Figure 8B:
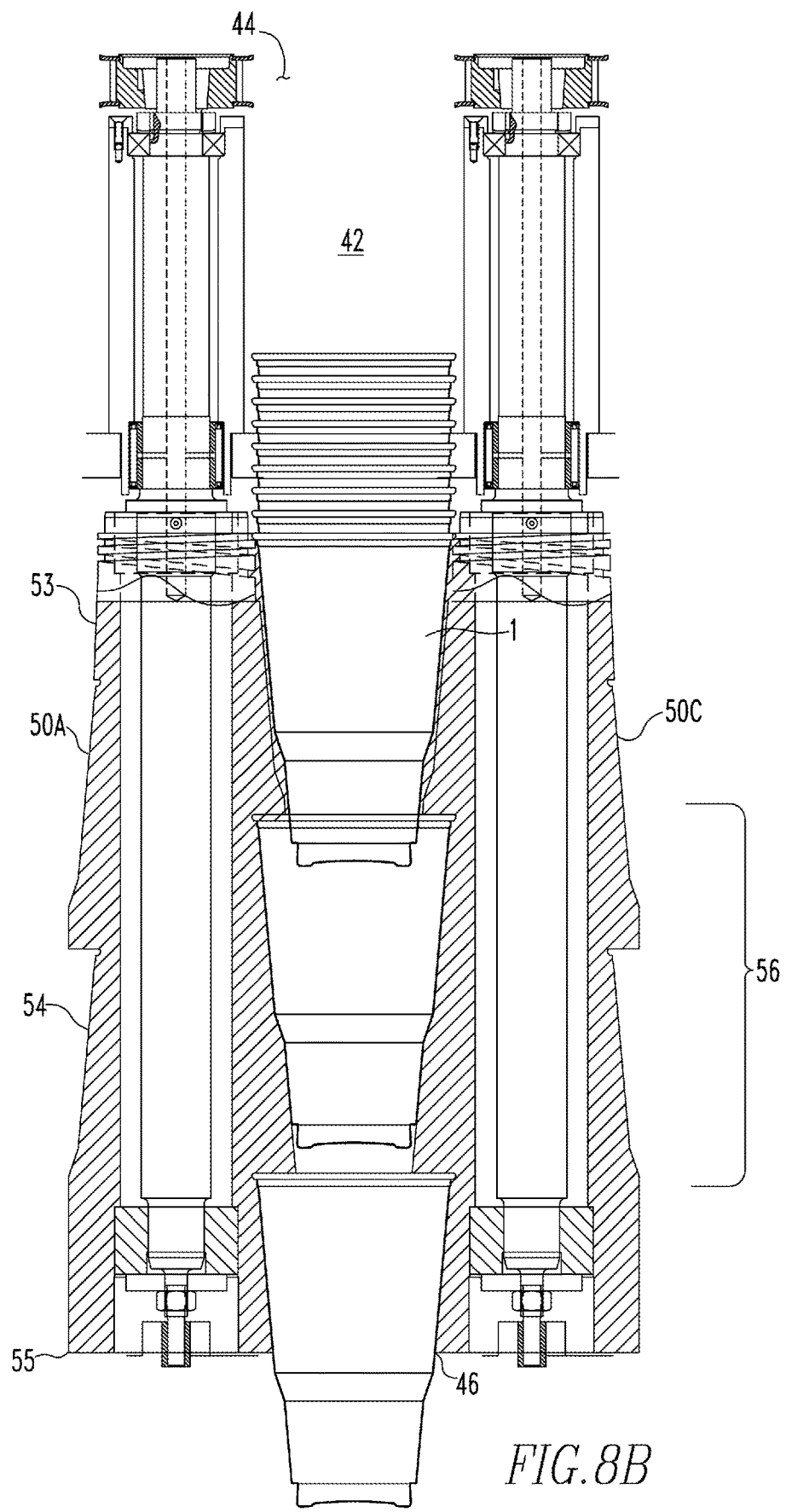
FIG. 8B is another schematic cross-sectional side view of a feeder assembly with a cup in a second position.
Figure 8C:
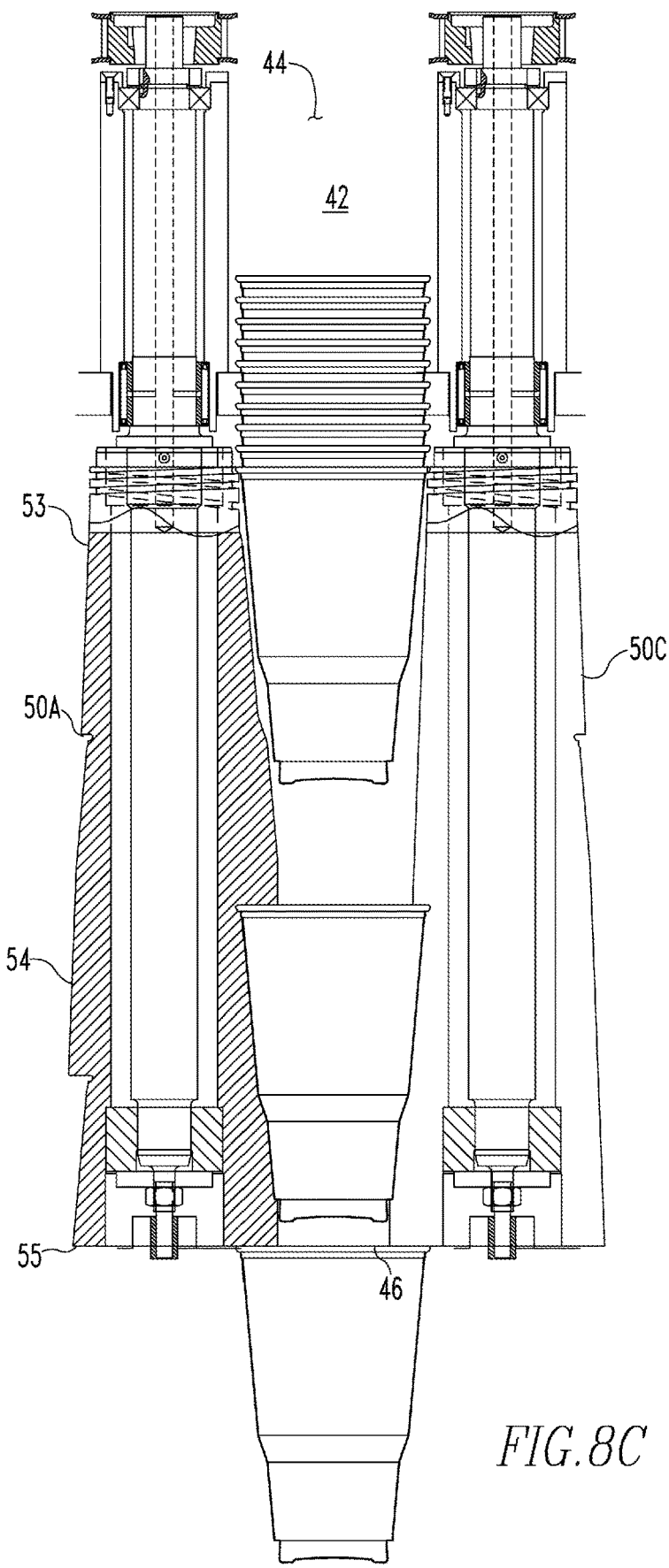
FIG. 8C is another schematic cross-sectional side view of a feeder assembly with a cup in a third position.

As shown in FIGS. 8A-8C, as the feedscrew members 50 rotate, the progressing cup cavity 70 moves downstream along the feedscrew members 50. Moreover, because the "pitch" of the ridge 62 varies, the progressing cup cavity 70 moves at a first speed adjacent the feedscrew member body first end 53 and accelerates to a second speed at the feedscrew member body second end 55. In the configuration shown, the second speed is faster than the first speed.

In an exemplary embodiment, and as shown in FIG. 9, each feedscrew assembly 40 includes a blower assembly 80 disposed at the cup path second end. In this configuration, the blower assembly 80 is structured to, and does, apply a positive air pressure into each cup 1 when each cup 1 is disposed at the cup path second end.

In operation, each feedscrew assembly 40 operates as follows. A cup 1 extends partially from a cup holder assembly frame outlet 26 and into the cup path 42. The feedscrew members 50 engage the cup 1 and draw the cup 1 from the cup holder assembly 20. That is, the cup 1 is moved so as to be generally disposed in a progressing cup cavity 70. As the feedscrew members 50 rotate, the progressing cup cavity 70, and therefore the cup 1, move toward the cup path second end (or downstream end) 46. During this period of travel, the feedscrew members 50 envelope the cup 1 so that the orientation of the cup 1 is controlled. When the progressing cup cavity 70, and therefore the cup 1, reach the cup path second end (or downstream end) 46, the feedscrew assembly blower 80 is actuated (or is continuously actuated) so that positive air pressure is applied to the inner surface of the cup 1. Thus, the positive air pressure is structured to propel each cup 1 toward the transfer disk assembly 100. Stated alternately, the feedscrew assembly blower 80 blows the cup 1 along, and/or beyond, the cup path 42 and toward the transfer disk assembly 100.

In an exemplary embodiment, there are two feedscrew assemblies 40; a first (or "even") feedscrew assembly 40A and a second (or "odd") feedscrew assembly 40B. The two feedscrew assemblies 40 are structured to alternately move a cup 1 to the transfer disk assembly 100. Due to the rotational speed to the transfer disk assembly 100, the two feedscrew assemblies 40 should not be disposed at the same radius on the transfer disk assembly 100. That is, for example, the prime axis 68 of the first feedscrew assembly 40A passes through the transfer disk assembly 100 at a first radius, and, the prime axis 68 of the second feedscrew assembly 40B passes through the transfer disk assembly 100 at a second radius, wherein the first and second radii are different. In an exemplary embodiment, the offset between the first and second radii is about the same as the maximum diameter of a cup 1.

In an exemplary embodiment, the cup transfer assembly 30 includes a feedscrew actuator 180 (shown schematically) that is structured to, and does, alternatively initiate the movement of a cup through one of the first feedscrew assembly 40A and the second feedscrew assembly 40B. Alternatively, the orientation of the feedscrew members 50, i.e., the position of the ridge(s) 62, initiate movement of a cup away from a stack of cups 1.

Figure 10:
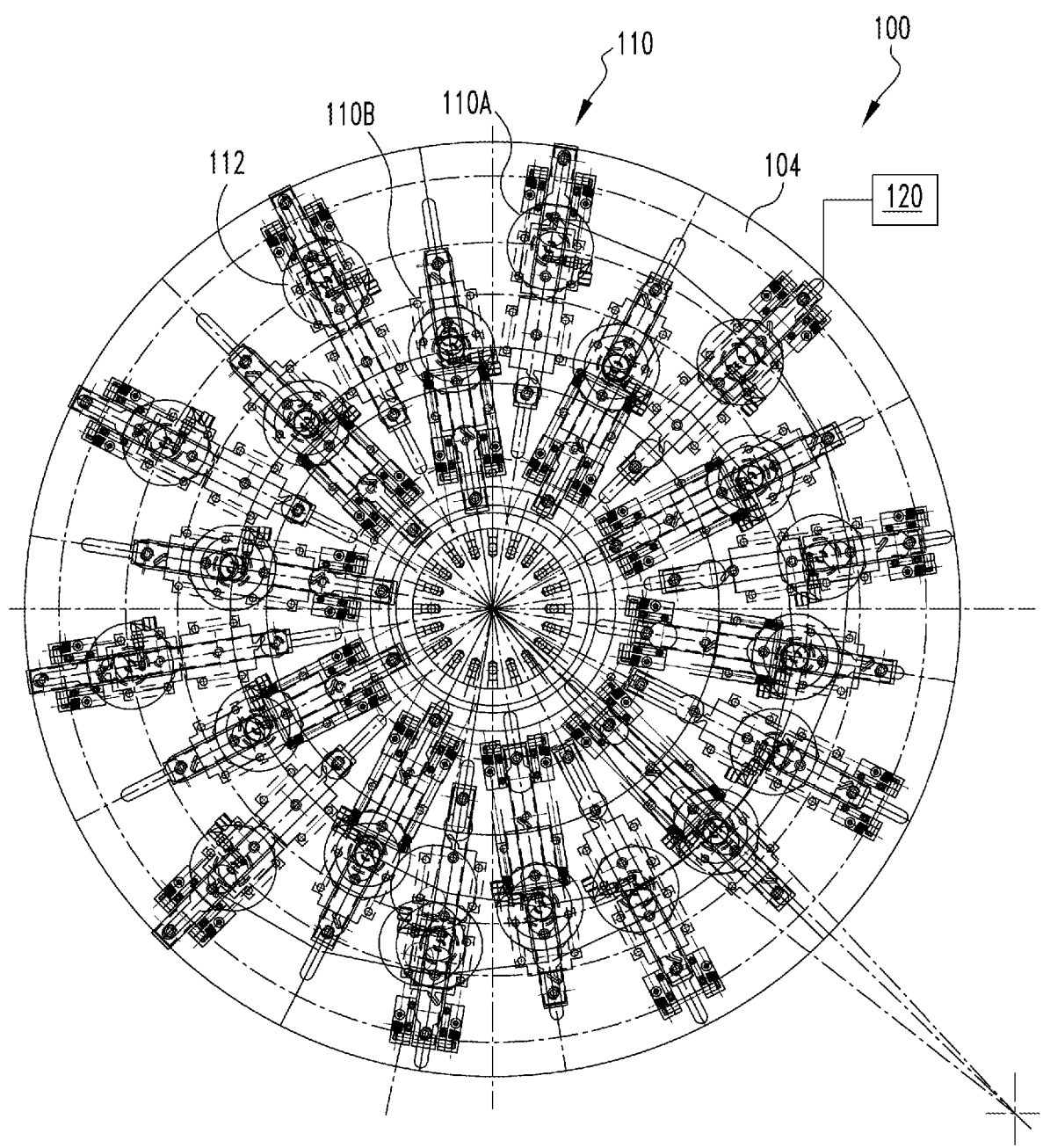
FIG. 10 is a schematic top view of a transfer disk assembly.

The transfer disk assembly 100 is structured to receive, and hold, a cup 1 from each feedscrew assembly 40, reposition each cup 1, and transfer each cup to the mandrel turret assembly 130, described below. As shown in FIGS. 10-11, the transfer disk assembly 100 includes a generally circular body 102 and a number of cup mounting assemblies 110. The transfer disk assembly body 102 includes an axial surface 104. The transfer disk assembly body 102 is rotatable. A motor or drive assembly (neither shown) is operatively coupled to the transfer disk assembly body 102 whereby the transfer disk assembly body 102 rotates about an axis of rotation 106.

The cup mounting assemblies 110 are structured to temporarily couple each cup 1 to the transfer disk assembly 100. In an exemplary embodiment, this is accomplished using suction applied to the outer surface of the bottom of the cup 1. That is, each cup mounting assembly 110 is structured to apply suction to the outer surface of the bottom of the cup 1. Each cup mounting assembly 110 is coupled to the transfer disk assembly body axial surface 104. The surface of each cup mounting assembly 110 opposite the transfer disk assembly body axial surface 104 is a cup mounting assembly distal surface 112. The cup mounting assemblies 110 are disposed circumferentially about the transfer disk assembly body 102. Further, the cup mounting assemblies 110 each have substantially similar dimensions so that the cup mounting assembly distal surfaces define a distal plane 114 (hereinafter, the "cup mounting assembly distal plane" 114).

Each cup mounting assembly 110, in an exemplary embodiment, includes, or is coupled and in fluid communication with, a bi-directional air pressure assembly 120 (shown schematically). As used herein, the bi-directional air pressure assembly 120 is "included" with each cup mounting assembly 110 if the cup mounting assembly 110 includes any portion of the bi-directional air pressure assembly 120 such as, but not limited to, a port 122. The bi-directional air pressure assembly 120 is structured to, and does, selectively apply a negative (vacuum) air pressure and a positive (blowing) air pressure. The nature of the air pressure, i.e., positive or negative, is structured to be switched individually at each cup mounting assembly 110. Thus, some cup mounting assemblies 110 are exposed to a negative air pressure while simultaneously other cup mounting assemblies 110 are exposed to a positive air pressure. In an exemplary embodiment, each cup mounting assembly 110 includes a port 122 disposed at the cup mounting assembly distal surface 112.

The bi-directional air pressure assembly 120 is structured to apply a negative air pressure when a cup mounting assembly 110 is disposed at or adjacent the cup path second end 46. In this configuration, the negative air pressure is structured to propel each cup 1 toward the transfer disk assembly 100 and, in an exemplary embodiment, toward a cup mounting assembly 110. The negative air pressure is maintained as the transfer disk assembly body 102 rotates. Thus, the negative air pressure, i.e., the bi-directional air pressure assembly 120, holds or maintains a cup 1 on an associated cup mounting assembly 110.

As the transfer disk assembly body 102 rotates further, each cup mounting assembly 110 is disposed at or adjacent a mandrel assembly 140 on the mandrel turret assembly 130. When each cup mounting assembly 110 is disposed at or adjacent a mandrel assembly 140 on the mandrel turret assembly 130, the bi-directional air pressure assembly 120 switches from a negative air pressure to a positive air pressure. Thus, when each cup mounting assembly 110 is disposed at or adjacent a mandrel assembly 140 on the mandrel turret assembly 130, the bi-directional air pressure assembly 120 blows the cup 1 away from the cup mounting assembly 110 and toward the mandrel turret assembly 130 and onto a mandrel assembly 140. Thus, the bi-directional air pressure assembly 120 is structured to apply a negative air pressure at each cup 1 bottom outer side when each cup 1 is disposed at the cup path second end 46, to maintain the negative air pressure as the transfer disk assembly body 102 rotates, then to apply a positive air pressure at each cup 1 bottom outer side when the cup 1 is adjacent the mandrel turret assembly 130.

As noted above, due to the rotational speed to the transfer disk assembly 100, the two feedscrew assemblies 40 should not be disposed at the same radius on the transfer disk assembly 100. Thus, the cup mounting assemblies 110 must also be disposed at two different radii on the transfer disk assembly body 102 so as to be aligned with the cup path second end 46 of the different feedscrew assemblies 40. The mandrel assemblies 140 on the mandrel turret assembly 130, however, are not disposed at two different radii. Thus, a number of the cup mounting assemblies 110 are structured to move radially on the transfer disk assembly body 102. That is, in an exemplary embodiment, a number of cup mounting assemblies 110 includes a first set of cup mounting assemblies 110A and a second set of cup mounting assemblies 110B. The first set of cup mounting assemblies 110A are disposed at a first radius on the transfer disk assembly 100. When the cup mounting assemblies 110 are adjacent the mandrel turret assembly 130, the cup mounting assemblies 110 at the first radius are generally aligned with a mandrel assembly 140 on the mandrel turret assembly 130. In this configuration, the first set of cup mounting assemblies 110A are not required to move. Each cup mounting assembly 110 in the second set of cup mounting assemblies 110B is movably coupled to the transfer disk assembly body 102. Each cup mounting assembly 110 in the second set of cup mounting assemblies 110B is structured to move between a first radius and a second radius. In this configuration, each cup mounting assembly 110 in the second set of cup mounting assemblies 110B is structured to, and does, move between the first radius and a second radius. That is, when each cup mounting assembly 110 in the second set of cup mounting assemblies 110B is disposed at the second feedscrew assembly 40B cup path second end 46, each cup mounting assembly 110 in the second set of cup mounting assemblies 110B is disposed at the second radius. That is, each cup mounting assembly 110 in the second set of cup mounting assemblies 110B is generally aligned with the second feedscrew assembly 40B cup path second end 46. As the transfer disk assembly body 102 rotates and each cup mounting assembly 110 in the second set of cup mounting assemblies 110B moves toward the mandrel turret assembly 130, each cup mounting assembly 110 in the second set of cup mounting assemblies 110B moves also toward the first radius. Thus, when each cup mounting assembly 110 in the second set of cup mounting assemblies 110B is at the mandrel turret assembly 130, each cup mounting assembly 110 in the second set of cup mounting assemblies 110B is also at the first radius.

In an exemplary embodiment, and as shown in FIG. 11A, the transfer disk assembly 100 includes a cam slide assembly 170 which is structured to, and does, move each cup mounting assembly 110 in the second set of cup mounting assemblies 110B between the first and second radii as described above. That is, as shown in FIGS. 12-11B, the transfer disk assembly 100 includes the transfer disk assembly body 102 as noted above. A drive assembly (not shown) is operatively coupled to the transfer disk assembly body 102 whereby the transfer disk assembly body 102 rotates. The transfer disk assembly body 102, in an exemplary embodiment, includes a number of radially extending slots 172 (hereinafter "radially slot(s)" 172), which are also identified herein as part of the cam slide assembly 170. In an exemplary embodiment, there is one radially extending slot 172 for each cup mounting assembly 110 in the second set of cup mounting assemblies 110B. The cam slide assembly 170 also includes a cam disk 174. The cam disk includes a body 176 disposed adjacent the transfer disk assembly body 102. In an exemplary embodiment, the cam disk body 176 is fixed relative to the transfer disk assembly body 102. That is, the cam disk body 176 does not rotate. The cam disk body 176 defines a number of channels 178 including an eccentric cam channel 179. That is, in an exemplary embodiment, the cam channel 179 is generally circular, but the center of the generally circular cam channel 179 is not the center, i.e., axis of rotation, of the cam disk body 176.

Each cam slide assembly 170 also includes a base 190 that, in an exemplary embodiment, defines a path over which a carriage assembly 192 travels. The carriage assembly supports a cup mounting assembly 110 in the second set of cup mounting assemblies 110B. The carriage assembly 192 includes an elongated cam follower 194 having a stem 196 and a base 198. The cam follower stem 196 extends through one radially extending slots 172 and the cam follower base 198 is disposed in the eccentric cam channel 179. In this configuration, and when the transfer disk assembly body 102 rotates relative to the cam disk body 176, the cam follower base 198 engages the eccentric cam channel 179 which causes the carriage assembly 192 to reciprocate over a radially extending path. That is, the carriage assembly 192, and therefore the associated cup mounting assembly 110, reciprocates over a radially extending path relative to the transfer disk assembly body 102. It is understood that, simultaneously, the transfer disk assembly body 102 is rotating so that the carriage assembly 192, and therefore the associated cup mounting assembly 110, travels over an eccentric path, i.e., a circular path that is offset relative to the axis of rotation of the cam disk body 176.

The mandrel turret assembly 130 is known in the art. Thus, as is known, the mandrel turret assembly 130 includes a turret disk 132 and a number of mandrel assemblies 140. The turret disk 132 includes a generally cylindrical body 134 structured to rotate about an axis of rotation 136. The turret disk 132 has an axial surface 138. A motor or drive assembly (not shown) is operatively coupled to the turret disk 132 and is structured to, and does, cause the turret disk 132 to rotate about the turret disk axis of rotation 136. Further, the mandrel turret assembly 130, i.e., the turret disk 132, is structured to, and does, rotate at a generally constant speed. That is, the turret disk 132 does not move with an indexed, or intermittent, motion. This solves the problems stated above.

As is known, a mandrel assembly 140 includes an elongated mandrel shaft (not shown) and an elongated mandrel body 142. Each mandrel body 142 is rotatably disposed on an associated mandrel shaft and is structured to, and does, rotate thereabout. Thus, each mandrel assembly 140 has an axis of rotation 144. A motor or drive assembly (not shown) is operatively coupled to each mandrel assembly 140 and is structured to, and does, cause each mandrel body 142 to rotate about the associated mandrel shaft. Each mandrel assembly 140 is disposed on the turret disk axial surface 138. In an exemplary embodiment, each mandrel assembly 140 includes, or is in fluid communication with, a mandrel turret assembly bi-directional pressure assembly 150 (shown schematically). As is known, a nozzle (not shown) that is in fluid communication with the mandrel turret assembly bi-directional pressure assembly 150 is disposed at, or near, the distal end of each mandrel assembly 140. In this configuration, a negative pressure is applied to each cup 1, and as shown, to each cup 1 interior bottom surface, as the cup 1 is moved to the mandrel turret assembly 130. That is, a vacuum helps moves, and then maintains, the cup 1 on an associated mandrel assembly 140.

As the turret disk 132 rotates, each mandrel assembly 140, and therefore each cup 1 disposed thereon, moves along a path adjacent to the print assembly 160 (shown schematically). Each cup 1 is decorated, i.e., has ink, paint, or another coating applied thereto, as the cup 1 moves by the print assembly 160. After the cup 1 is decorated by the print assembly 160, the mandrel turret assembly bi-directional pressure assembly 150 applies a positive pressure and the cup 1 is blown off the mandrel assembly 140 and is further processed as is known.

The decorator assembly 10 is further configured as follows. The feedscrew assemblies 40 are disposed adjacent to, and at a clearance distance from the cup mounting assembly distal plane 114. As used herein, a "clearance distance" means that the space between the feedscrew assemblies 40, i.e., the cup path second end 46, and the cup mounting assembly distal plane 114 is larger than the height of a cup 1. In this configuration, a cup 1 seated on a cup mounting assembly 110 is structured to, and does, rotate with the transfer disk assembly body 102 and cannot contact a feedscrew assembly 40. This solves the problems stated above.

Further, each feedscrew assembly 40 is structured to position a cup 1 in a transfer position with a minimal offset or a specific minimal offset. As used herein, a cup "transfer position" is the position of the cup as it leaves the cup path second end 46. As used herein, the cup "offset" means the distance between the cup 1 bottom and the construct to which the cup 1 is being moved. As used herein, a "minimal offset" means an offset of between about ⅛ inch and about ⅝ inch. As used herein, a "specific minimal offset" means an offset of about ⅜ inch. In another exemplary embodiment, there is an "alternate minimal offset" which, as used herein, means an offset of between about ⅛ inch and about ¼ inch. This configuration is possible due to the cups 1 being disposed in a bottom leading configuration. That is, in the prior art wherein cups were disposed in a top leading configuration, as the cups moved to, and past, the cup path second end, the open top of the cup was disposed adjacent a mandrel assembly. Thus, the cup bottom was spaced about the entire cup height away from the construct to which the cup 1 is being moved. In this configuration, the cup was generally not in contact with any construct which controlled the orientation of the cup as the cup moved from the transfer position to the mandrel; this distance was generally the height of the cup. When each feedscrew assembly 40 is structured to position a cup 1 in a transfer position with a minimal offset or a specific minimal offset, (or an alternate minimal offset) the cup 1 is only out of contact with a construct that controls the orientation of the cup for a distance equal to the minimal offset or the specific minimal offset. That is, because the cup 1 is "enveloped" by the feedscrew assembly 40, as defined above, the orientation of the cup 1 is controlled except for the time the cup 1 crosses the offset. This solves the problems stated above.

In an exemplary embodiment, each feedscrew assembly prime axis 68 is generally perpendicular to the cup mounting assembly distal plane 114. In this configuration, each feedscrew assembly blower assembly 80 is structured to, and does blow each cup toward the transfer disk assembly body 102 in a perpendicular orientation. As used herein, a cup 1 in a "perpendicular orientation" relative to a transfer disk assembly body 102 means that the plane of the cup bottom is generally parallel to the transfer disk assembly body axial surface 104. Further, each feedscrew assembly prime axis 68 is generally parallel to the transfer disk assembly body axis of rotation 106.

The transfer disk assembly 100 is further disposed adjacent the mandrel turret assembly 130. In this configuration, each cup mounting assembly 110 on the transfer disk assembly 100 is, at one point, generally aligned with a mandrel assembly 140. As used herein, "generally aligned" when used in association with the cup mounting assemblies 110 means that a line normal to the cup mounting assembly distal plane 114 is generally co-extensive with the longitudinal axis of the other identified construct. Thus, when the transfer disk assembly 100 is disposed adjacent the mandrel turret assembly 130, and at one point during the rotation of the transfer disk assembly 100, a line normal to the cup mounting assembly distal plane 114 is, generally co-extensive with the longitudinal axis of a mandrel assembly 140. Further, the transfer disk assembly body axis of rotation 106 is generally parallel to the turret disk axis of rotation 136.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A decorator assembly comprising:
a cup holder assembly structured to hold a number of tapered cups in a nested, bottom leading configuration;
a decorator mandrel turret assembly structured to rotatably support a number of said tapered cups; and
a cup transfer assembly structured to move said tapered cups from said cup holder assembly to said decorator mandrel turret assembly,
wherein each of said tapered cups includes an elongated body having a base with an upwardly depending, and outwardly tapered, sidewall,
said cup transfer assembly includes a number of feedscrew assemblies and a transfer disk;
each feedscrew assembly structured to de-nest and move a tapered cup from a nested stack of tapered cups to said transfer disk;
each feedscrew assembly defining an elongated cup path;
each said cup path having a first end and a second end;
said transfer disk including a generally circular body and a number of cup mounting assemblies;
said transfer disk body including an axial surface;
said cup mounting assemblies disposed on transfer disk body axial surface and disposed circumferentially about said transfer disk body;
each said cup mounting assembly including a distal surface;
said cup mounting assembly distal surfaces defining a distal plane;
said cup path second end disposed at a clearance distance from said cup mounting assembly distal plane,
wherein said cup transfer assembly is structured to apply a bi-directional air pressure to each said tapered cup as each said cup is disposed at said cup path second end,
each feedscrew assembly includes a blower assembly;
each said blower assembly structured to apply a positive air pressure into each said cup when each said cup is disposed at said cup path second end;
wherein said positive air pressure is structured to propel each said tapered cup toward said transfer disk,
each said cup mounting assembly includes a bi-directional air pressure assembly;
each said bi-directional air pressure assembly structured to apply a negative air pressure at each cup bottom outer side when each said tapered cup is disposed at said cup path second end;
wherein said negative air pressure is structured to propel each said tapered cup toward said transfer disk,
said decorator mandrel turret assembly includes a turret disk and a number of mandrel assemblies;
each said mandrel assembly rotatably coupled to said turret disk;
said turret disk structured to rotate about an axis of rotation;
said transfer disk is structured to rotate about an axis of rotation;
wherein each said cup mounting assembly rotates from a first position, wherein each said cup mounting assembly is disposed adjacent said cup path second end, and a second position, wherein each said cup mounting assembly is disposed adjacent said turret disk; and
wherein, when each said cup mounting assembly is disposed adjacent said turret disk, said bi-directional air pressure assembly is structured to apply a positive air pressure at each cup bottom outer side.

2. The decorator assembly of claim 1 wherein:
each feedscrew assembly includes a plurality of elongated feedscrew members;
said plurality of feedscrew members disposed adjacent to each other with the longitudinal axes thereof disposed substantially parallel to each other;
each said feedscrew member including a body with an outer surface; and
each said feedscrew member body outer surface defining a number of sequential helical conical portions.

3. The decorator assembly of claim 2 wherein:
said plurality of elongated feedscrew members including four feedscrew members;
said four feedscrew members disposed about a prime axis, wherein said prime axis is substantially parallel to each feedscrew member longitudinal axis;
wherein said feedscrew members define a progressing cup cavity; and
said cup cavity corresponding to the outer surface of said cups.

4. The decorator assembly of claim 2 wherein each feedscrew member has a resilient outer surface.

5. A decorator assembly comprising:
a cup holder assembly structured to hold a number of tapered cups in a nested, bottom leading configuration;
a decorator mandrel turret assembly structured to rotatably support a number of said tapered cups; and
a cup transfer assembly structured to move said tapered cups from said cup holder assembly to said decorator mandrel turret assembly,
wherein each of said tapered cups includes an elongated body having a base with an upwardly depending, and outwardly tapered, sidewall,
said cup transfer assembly includes a number of feedscrew assemblies and a transfer disk;
each feedscrew assembly structured to de-nest and move a tapered cup from a nested stack of tapered cups to said transfer disk;
each feedscrew assembly defining an elongated cup path;
each said cup path having a first end and a second end;
said transfer disk including a generally circular body and a number of cup mounting assemblies;
said transfer disk body including an axial surface;
said cup mounting assemblies disposed on transfer disk body axial surface and disposed circumferentially about said transfer disk body;
each said cup mounting assembly including a distal surface;

said cup mounting assembly distal surfaces defining a distal plane;
said cup path second end disposed at a clearance distance from said cup mounting assembly distal plane,
said number of feedscrew assemblies includes a first feedscrew assembly and a second feedscrew assembly;
said number of cup mounting assemblies includes a first set of cup mounting assemblies and a second set of cup mounting assemblies;
said first set of cup mounting assemblies disposed at a first radius; and
said second set of cup mounting assemblies disposed at a second radius.

6. A decorator assembly comprising:
a cup holder assembly structured to hold a number of tapered cups in a nested, bottom leading configuration;
a decorator mandrel turret assembly structured to rotatably support a number of said tapered cups; and
a cup transfer assembly structured to move said tapered cups from said cup holder assembly to said decorator mandrel turret assembly,
wherein each of said tapered cups includes an elongated body having a base with an upwardly depending, and outwardly tapered, sidewall,
said cup transfer assembly includes a number of feedscrew assemblies and a transfer disk;
each feedscrew assembly structured to de-nest and move a tapered cup from a nested stack of tapered cups to said transfer disk;
each feedscrew assembly defining an elongated cup path;
each said cup path having a first end and a second end;
said transfer disk including a generally circular body and a number of cup mounting assemblies;
said transfer disk body including an axial surface;
said cup mounting assemblies disposed on transfer disk body axial surface and disposed circumferentially about said transfer disk body;
each said cup mounting assembly including a distal surface;
said cup mounting assembly distal surfaces defining a distal plane;
said cup path second end disposed at a clearance distance from said cup mounting assembly distal plane,
said number of feedscrew assemblies includes a first feedscrew assembly and a second feedscrew assembly;
said number of cup mounting assemblies includes a first set of cup mounting assemblies and a second set of cup mounting assemblies;
said first set of cup mounting assemblies disposed at a first radius;
each cup mounting assembly in said second set of cup mounting assemblies movably coupled to said transfer disk assembly body; and
each cup mounting assembly in said second set of cup mounting assemblies structured to move between a first radius and a second radius.

7. The decorator assembly of claim 6 wherein:
each cup mounting assembly in said second set of cup mounting assemblies includes a cam slide assembly; and
each said cup mounting assembly cam slide assembly structured to move an associated cup mounting assembly between a first radius and a second radius.

8. The decorator assembly of claim 6 wherein said cup transfer assembly includes a feedscrew actuator structured to alternatively initiate the movement of a cup through one of said first feedscrew assembly and said second feedscrew assembly.

9. A decorator assembly comprising:
a cup holder assembly structured to hold a number of tapered cups in a nested, bottom leading configuration;
a decorator mandrel turret assembly structured to rotatably support a number of said tapered cups; and
a cup transfer assembly structured to move said tapered cups from said cup holder assembly to said decorator mandrel turret assembly,
wherein each of said tapered cups includes an elongated body having a base with an upwardly depending, and outwardly tapered, sidewall,
said cup transfer assembly includes a number of feedscrew assemblies and a transfer disk;
each feedscrew assembly structured to de-nest and move a tapered cup from a nested stack of tapered cups to said transfer disk;
each feedscrew assembly defining an elongated cup path;
each said cup path having a first end and a second end;
said transfer disk including a generally circular body and a number of cup mounting assemblies;
said transfer disk body including an axial surface;
said cup mounting assemblies disposed on transfer disk body axial surface and disposed circumferentially about said transfer disk body;
each said cup mounting assembly including a distal surface;
said cup mounting assembly distal surfaces defining a distal plane;
said cup path second end disposed at a clearance distance from said cup mounting assembly distal plane,
said transfer disk assembly is structured to rotate about an axis of rotation;
said decorator mandrel turret assembly includes a turret disk and a number of mandrel assemblies;
each said mandrel assembly movably and rotatably coupled to said turret disk;
said turret disk structured to rotate about an axis of rotation;
wherein each said cup mounting assembly rotates from a first position, wherein each said cup mounting assembly is disposed adjacent said cup path second end, and a second position, wherein each said cup mounting assembly is disposed adjacent said turret disk;
each said mandrel assembly includes a negative pressure air pressure assembly; and
each said mandrel assembly negative pressure air pressure assembly structured to apply a negative pressure to the inner surface of a cup when each said cup mounting assembly is in said second position.

10. The decorator assembly of claim 9 wherein:
each said mandrel assembly includes a cam slide assembly; and
each said mandrel assembly cam slide assembly structured to move an associated mandrel assembly between a first radius and a second radius.

11. The decorator assembly of claim 9 wherein:
said decorator mandrel turret assembly includes a turret disk; and
wherein said turret disk is structured to move a generally constant rotational speed.

12. The decorator assembly of claim 9 wherein said decorator mandrel turret assembly is structured to move continuously without an indexing or intermittent motion.

13. The decorator assembly of claim 9 wherein said decorator mandrel turret assembly defines an obstruction free feeder space.

\* \* \* \* \*